Jan. 1, 1957 R. S. HOOD 2,776,284
APPARATUS AND METHOD FOR PRODUCING MELAMINE
Filed Sept. 27, 1952
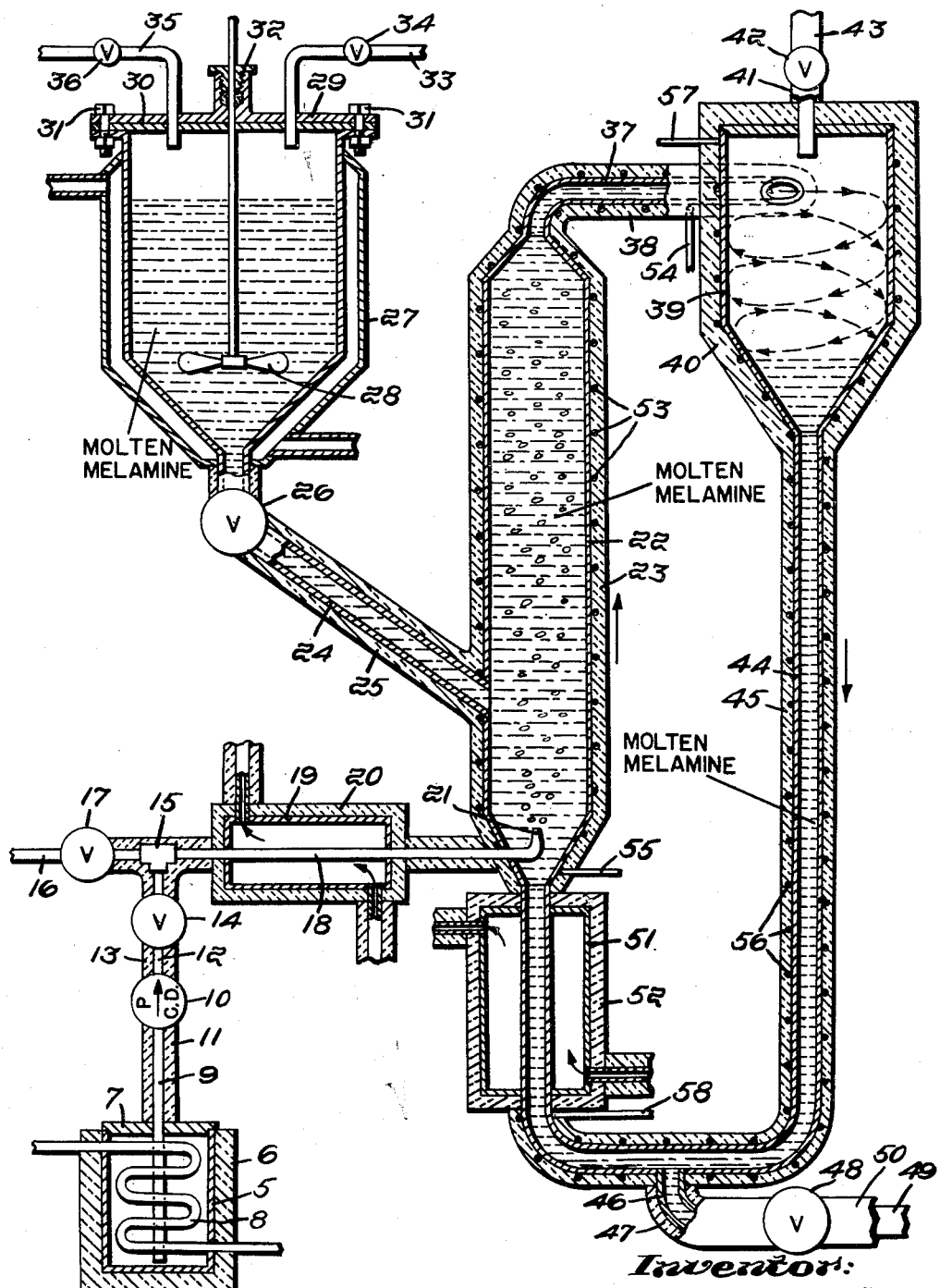
Inventor:
Ralph S. Hood,
by Richard W. Sternberg
Attorney United States Patent Office 2,776,284
Patented Jan. 1, 1957

2,776,284

APPARATUS AND METHOD FOR PRODUCING MELAMINE

Ralph S. Hood, Marblehead, Mass., assignor to Monsanto Chemical Company, St. Louis, Mo., a corporation of Delaware Application September 27, 1952, Serial No. 311,853

8 Claims. (Cl. 260—249.7)

The present invention relates to the production of melamine from urea, and particularly to improvements in an apparatus and method for the continuous production of melamine from urea.

British Patent No. 639,962 describes a process for producing melamine from urea. According to this patent, molten urea at a temperature of about 275° C. and under a pressure of 400 atmospheres is first pumped by means of a heated pump through a converter, which consists of a pressure-resistant narrow tube heated to a temperature of 450° C. by means of a lead bath, for a contact time of about 0.3 to 3.5 minutes, after which the reaction products are quenched in an aqueous medium under pressure. The resulting aqueous melamine-containing mixture is then passed through a heated let-down valve, filtered under pressure to remove insolubles, flashed in a flash evaporator and cooled to crystallize the melamine formed in the process. In the description of the British patent, it is pointed out that narrow reactor tubes are used, and it is also pointed out that the formation of insolubles from urea in such tubes causes almost instantaneous plugging of the tubes unless the content of insolubles is kept very low, that is, below a few tenths of one percent. In such a process the urea is first converted to various intermediate products, including the insolubles, on its passage through the reactor tubes and melamine is finally formed from such intermediate products. Accordingly, the urea entering one end of the tube is never in contact with the melamine formed at the other end of the tube. The process described in the British patent is very difficult to operate because plugging of the reactor tube occurs almost immediately unless the operating conditions of temperature, pressure and retention time in the tubes are properly controlled within narrow limits. However, it is extremely difficult to attain and maintain such operating conditions on a commercial scale. Moreover, stainless steel reactor tubes generally are not suitable for use with such a process because of excessive corrosion.

A process has been proposed for overcoming the problems encountered in the process of British Patent No. 639,962. This process, which is described in the application of Alban J. Lobdell, Serial No. 264,349, filed December 31, 1951, comprises continuously admixing molten urea and an excess of molten melamine which is at a temperature sufficiently high to convert the urea to melamine and to remain in the molten state in a reaction zone at a superatmospheric pressure sufficiently high to prevent appreciable vaporization and deamination of the melamine without supplying any heat to the reaction zone other than the heat supplied by the molten melamine, whereby the urea is converted to melamine and gaseous by-products, thereafter, but without any specific sequence, removing an amount of gaseous by-products sufficient to maintain the pressure in the reaction zone at the operating pressure, removing molten melamine from the reaction zone, heating the molten melamine to a temperature sufficiently high to convert urea to molten melamine according to the initial step of the process, and then recycling sufficient of the resulting melamine to the reaction zone to provide an excess of melamine for admixture with additional quantities of molten urea according to the initial step of the process. The Lobdell application, which is assigned to the same assignee as the present application, describes pumping molten melamine from the reaction zone through a heat exchanger and then back to the reaction zone. The present invention is an improvement over the process and apparatus disclosed in the Lobdell application in that the pumping of molten melamine in such manner is eliminated by the apparatus and method of the present invention.

It is one object of the present invention to provide a simple apparatus in which melamine may be produced continuously from urea with a minimum of plugging and corrosion difficulties and with the use of a minimum of moving parts.

It is a further object of this invention to provide a simple process for continuously producing melamine from urea.

Still further objects and advantages of this invention will become apparent from the following description when considered in connection with the accompanying drawing and the appended claims.

In the accompanying drawing, which forms a part of this specification, and in which like numerals are employed to designate like parts throughout the same, the single figure is a central vertical longitudinal section through a melamine-producing device embodying the present invention.

In the drawing wherein, for the purpose of illustration, is shown a preferred embodiment of the present invention, the numeral 5 designates a metal vessel or other suitable vessel, which is capable of being heated, in which urea is melted. This vessel is provided with insulation 6 and an insulated cover 7 to prevent excessive heat losses. Positioned inside of the vessel is a heating coil or pipe 8 through which is circulated a hot gas such as steam or a hot liquid from a suitable source (not shown) for the purpose of melting urea in the vessel. Positioned vertically in the vessel and terminating near the bottom thereof is a pipe 9 which passes through an opening in the cover 7 and is connected in communicative relationship to the intake or input end of a high pressure, constant delivery, displacement pump 10. The portion of the pipe between the cover 7 and the pump is provided with insulation 11 to prevent excessive heat losses. Another pipe 12 is connected in communicative relationship with the output or outlet end of pump 10, and this pipe, which is provided with insulation 13 and a valve 14, is also connected to T 15. Also connected to T 15 is a pipe 16, which is provided with a valve 17, for supplying gaseous or liquid anhydrous ammonia when required in the operation of the device. Pipe 18, which is also connected to the T, extends horizontally, passing through a heat exchanger 19, which is provided with insulation 20, and terminating in a vertically arranged nozzle 21. This pipe is provided with insulation except on the portion of the pipe within the heat exchanger. The heat exchanger, which is heated by high pressure steam, hot gases or hot liquids from a suitable source (not shown), or which is cooled by cool gases or cool liquids from a suitable source (not shown), serves the function of heating or cooling the materials passing through pipe 18.

The nozzle 21 is positioned vertically in a pressure and corrosion resistant, generally cylindrical vessel 22, which is provided with a frusto-conical bottom and top portion, the nozzle being substantially coincident with the vertical center line through this vessel, and is preferably located substantially in the frusto-conical bottom portion of the vessel. This vessel, which is provided with insulation 23 to prevent excessive heat losses, is suitably constructed of stainless steel or some other suitable pressure and corrosion metal or alloy, and may also be constructed of iron or steel and lined with glass or a suitable ceramic material since it is not necessary or desirable, except in starting up the device, to heat this portion of the apparatus. The vessel 22 provides a reaction zone which is primarily full of molten melamine and into which molten urea is fed for conversion to molten melamine.

Connected to the side of vessel 22 in communicative relationship therewith is a pressure and corrosion resistant pipe or tube 24 which is provided with insulation 25 to prevent excessive heat losses. This pipe serves to convey molten melamine to the vessel 22 in starting up the operation of the device, as will be explained in greater detail hereinafter, and is provided with a valve 26. The other end of this pipe is connected to the bottom of a jacketed, pressure-resistant, melamine melting tank 27 which is provided with a stirrer 28 and a cover 29 which, in normal operation, is bolted to flange 30 by means of bolts 31. The shaft of the stirrer passes through a sealed bearing 32 in cover 29 and is rotated directly by means of a vertically mounted electric motor (not shown). Opening into the tank 27 and connected to the cover 29 is a pipe 33, provided with a valve 34, through which anhydrous liquid ammonia is supplied to tank 27 from a suitable source (not shown). Also opening into tank 27 and connected to cover 29 is a pipe 35, provided with a valve 36, through which ammonia gas and air are released from the tank during the preparation of molten melamine in the tank. As is indicated above, tank 27 is used for preparing a batch of molten melamine which is supplied to the vessel 22 for starting up the melamine producing device, and it serves no other function. This tank is jacketed and thus may be heated by hot gases or hot fluids to heat a mixture of ammonia and melamine in the tank until molten melamine is obtained. The heating gases or liquids are supplied to the jacket from a suitable source (not shown).

Connected to the top of vessel 22 in communicative relationship therewith is a pressure and corrosion pipe 37 (suitably constructed of stainless steel), which is provided with an insulated covering 38. This pipe, which is in a generally horizontal position, opens into a pressure and corrosion resistant gas-liquid separator such as cyclone separator 39, and is mounted tangentially to the sidewall of the separator. This separator, which is suitably made of stainless steel or other corrosion-resistant material, serves the function of separating the gases in the device from the molten melamine, and is provided with insulation 40 to prevent excessive heat losses.

Positioned substantially coincident with the vertical center line through the separator and opening into the top portion thereof is a pressure-resistant, insulated pipe 41 which is connected in communicative relationship with a hot let-down valve 42 through which hot gases are released from the separator to control the pressure in the apparatus. An insulated pipe 43 is connected to the outlet or output end of valve 42 for the purpose of conveying the gases released through the valve to a converter or gas adsorbing device (not shown).

Connected to the bottom of the separator 39 and the vessel 22 in the communicative relationship therewith is a pressure and corrosion resistant pipe 44 which is generally U-shaped, and this pipe, which is suitably made of stainless steel or other corrosion-resistant material, is provided with insulation 45 to prevent excessive heat losses. One of the functions of this pipe is to provide a passage for the molten melamine in the separator to the bottom of vessel 22. Connected to the bottom of pipe 44 in communicative relationship therewith is a pressure-resistant pipe 46, provided with insulation 47. This pipe is used for removing a portion of the molten melamine from the apparatus during continuous operation thereof, and is connected to a hot let-down valve 48 through which the molten melamine is released to atmospheric pressure. A pipe 49, which is provided with insulation 50, is connected to the output or outlet end of valve 48 for the purpose of conveying melamine which, at this stage, is generally suspended as a solid in a gaseous stream of ammonia to a separating device such as a bag filter or the like (not shown).

That portion of the U-shaped pipe 44 which is immediately below vessel 22 passes through a heat exchanger or furnace 51, where the pipe is heated by means of hot gases (such as flue gases obtained by burning coal, gas or oil) or by means of a hot liquid bath such as a molten lead bath or a molten sodium nitrate bath or the like, which gases or liquid baths are supplied from a suitable source (not shown). This heat exchanger is provided with insulation 52 to prevent excessive heat losses.

In order to obtain high heat input in starting up the operation of the device, high electrical resistance wire 53, which terminates in electrical contacts 54 and 55, is wound in a spiral around vessel 22 and pipe 37, and electrical current is supplied to this wire to heat these members from a suitable source (not shown). This source of heat is not usually employed after continuous operation of the device is initiated. A similar wire 56 is wound in a spiral around the cyclone separator 39 and the U-shaped pipe 44 except that portion of the pipe which passes through the heat exchanger 51. This wire terminates in electrical contacts 57 and 58 to which electrical current is supplied from a source (not shown) to heat the wire and thus supply heat to the separator 39 and pipe 44. This source of heat is usually not used after continuous operation of the device has been initiated.

In order to operate the device described herein with a minimum of corrosion and plugging difficulties, it is desirable that the vessel 22 be sufficiently large in diameter to avoid the formation of appreciable amounts of insoluble intermediate products, formed from the urea, on the walls of the vessel. Moreover, the vessel 22 should preferably be sufficiently high between the point of injection of the urea (nozzle 21) and the pipe 37 to obtain substantially complete conversion of the urea to melamine within the vessel, otherwise corrosion and plugging difficulties may be encountered in other parts of the device and the circulation of molten melamine through the system is apt to be adversely affected after the device has been in operation over a period of time. The height of vessel 22 depends on a variety of factors such as the diameter of the vessel, the temperature of the melamine in the vessel, the location of nozzle 21 and the quantity and rate of injection of the urea.

The operation of the melamine producing device is as follows:

In starting up the operation of the device, solid particles of melamine are first added to tank 27, while valve 26 is in the closed position and with the cover 29 removed. The tank used should preferably be sufficiently large to melt all of the melamine required in starting up the continuous production of melamine in the device. The cover 29 is then securely fastened to the flange 30 of the tank, to provide an air-tight fit, by means of bolts 31. The valve 34 is then opened to admit anhydrous liquid ammonia to tank 27, the amount of ammonia added being sufficient to displace the air in the tank and to provide an absolute pressure of at least 1500 pounds per square inch at a temperature of about 380° C. The valve 34 is then closed and the tank is heated, using hot flue gases at a temperature of at least 500° C. for this purpose. At this stage, valve 36 is open so that air and ammonia may be displaced from the tank until all or substantially all of the air is displaced. The valve is opened or closed as required during the heating of the melamine in the tank so that a pressure of at least 1500 pounds per square inch and preferably not in excess of 6000 pounds per square inch is maintained in the tank to prevent appreciable deamination of the melamine. After the tank 27 is heated to a temperature such that molten melamine forms in the bottom of the tank, the stirrer 28 is caused to rotate to assist in circulating the molten melamine to obtain better heat transfer to the unmelted melamine from the walls of the tank. Agitation and heating is continued until all of melamine in tank 27 is in the molten state and preferably at a temperature of 380° C. or higher and under an ammonia pressure of at least 1500 pounds per square inch and preferably at least 2000 pounds per square inch.

While molten melamine is being prepared in tank 27 as described above, anhydrous ammonia, either liquid or gaseous, is supplied, with valve 17 open, through pipes 16 and 18 to vessel 22. The amount of ammonia supplied should be sufficient to replace all of the air in vessel 22, pipe 37, separator 39 and pipe 44, and to provide a pressure of at least 1500 pounds per square inch at 380° C. in these parts of the device. While this ammonia is being supplied valves 14 and 48 are closed, and valve 42 is opened sufficiently to allow the air displaced by the ammonia to escape from the device. After all or substantially all of the air in the device has been displaced by ammonia, valve 42 is closed and the vessel 22 and pipe 37 are heated by passing an electric current through resistance wire 53, and separator 39 and pipe 44 are heated by passing an electric current through resistance wire 56, the amount of heat supplied being sufficient to maintain the walls of the device at a temperature above 380° C., and preferably between 400 and 500° C. During this heating period either valve 42 or valve 48 is opened, as required, to maintain the pressure in the above-mentioned parts of the device at a pressure of 1500 pounds per square inch or higher, but not higher, and preferably lower, than the pressure in tank 27, while maintaining valves 14 and 17 in the closed position. After the above temperatures have been attained the valve 26 below tank 27 is opened and the molten melamine is allowed to run into the vessel 22 by gravity, aided preferably by excess pressure in tank 27. Simultaneously, heat is supplied to the portion of pipe 44 below vessel 22 by means of heat exchanger 51 to which hot flue gases are supplied at a temperature of 450° C. or higher, and valve 17 is opened and gaseous ammonia is injected into vessel 22 through nozzle 21, after having first been preheated to a temperature of about 300° C. or higher by means of heat exchanger 19. Molten melamine is allowed to flow into vessel 22 from tank 27 until vessel 22 is full of molten melamine, while releasing ammonia gas through valve 42 as required to avoid excessive pressures. Valve 26 is then closed. At this stage, heating of vessel 22 and pipe 37 by means of resistance wire 53 may be continued and the heating of separator 39 and pipe 44 by means of resistance wire 56 is discontinued. As a result of this and the heat supplied to the melamine in that portion of pipe 44 below vessel 22 by heat exchanger 51 and the injection of hot gaseous ammonia into the molten melamine in vessel 22 through nozzle 21, the level of molten melamine in vessel 22 rises because the melamine has a relatively low density, and the level of molten melamine in separator 39 and that portion of pipe 44 below the separator decreases because the melamine in this portion of the device has a relatively high density. Consequently, the molten melamine in vessel 22 flows through pipe 37 into separator 39 where ammonia bubbles therein separate from the liquid melamine phase and collect in the upper half of the separator, while the molten melamine spirals downward as a liquid stream to the molten melamine level in the separator. When this stage is reached, the device is ready for use in the continuous production of melamine from urea.

While the molten melamine is being supplied to vessel 22 from tank 27, urea is melted in the melter 5 by supplying sufficient heat to heating coil 8. After circulation of the molten melamine from vessel 22 through pipe 37 into separator 39 and thence through pipe 44 back to vessel 22 is established as set forth in the preceding description, valve 17 is closed and valve 14 is opened. Simultaneously with the opening of valve 14, the pumping of molten urea through pipes 9, 12 and 18 by means of pump 10 is started. This molten urea emerges in a stream from nozzle 21 and flows upwardly into the molten melamine in vessel 22 without appreciably contacting the walls of the vessel. The heat of the molten melamine converts the urea to various intermediate products and finally to melamine, ammonia and carbon dioxide, the latter two materials forming bubbles in the molten melamine. These bubbles together with the higher temperature of the molten melamine, due to the heat supplied by heat exchanger 51 as compared to the substantial absence of bubbles and the lower temperature of the molten melamine in separator 39 and the portion of pipe 44 below the separator and prior to the heat exchanger, causes a continuous upward circulation of the melamine in vessel 22, through pipe 37 into separator 39 and down pipe 44 back to heat exchanger 51.

Since a gaseous-molten melamine interface exists in separator 39, the gases which are not dissolved in the molten melamine separate from the molten melamine in the separator, and these gases are released, as required, through valve 42 to avoid excessive pressures. However, the amount of gases released should not lower the pressure below about 1500 pounds per square inch. The gases released through valve 42 and into pipe 43 may be conveyed to a gas adsorbing device, or used for the production of urea.

At this stage of operation, the heating of vessel 22 and pipe 37 by electrical resistance wire 53 is preferably discontinued so that the sole source of heat supplied to the molten melamine is the heat supplied by means of heat exchanger 51. Due to the formation of additional molten melamine in vessel 22 from the urea it becomes necessary to remove some melamine from the device. This may be accomplished by releasing molten melamine through the hot let-down valve 48 intermittently or continuously. In most instances, it is preferred to release the molten melamine continuously through valve 48 and at a rate substantially equal to the rate at which melamine is formed in vessel 22. The melamine released through valve 48 into pipe 49 is at atmospheric pressure or at a pressure not appreciably above atmospheric pressure, and is substantially in the solid state, although it may be present partly in the form of a liquid or gas. At the same time that the melamine is released, the gases dissolved therein separate from the melamine. This melamine is conveyed to a suitable separating device such as a bag filter or the like (not shown) and thus separated from the gaseous products which are primarily ammonia and carbon dioxide.

It is seen from the foregoing description that as the molten urea is continuously injected into the molten melamine in vessel 22 melamine is continuously formed, and continuous circulation of the molten melamine is obtained without the use of pumps or other devices having moving parts. This is of considerable advantage from the standpoint of low maintenance costs since there are no moving parts to repair other than the urea pump and thus very little need for shutting down the operation of the device to effect the repair of pumps or other moving parts. Moreover, substantially complete conversion of urea to melamine is obtained without the urea, or the intermediate derivatives obtained therefrom, contacting the heated walls of the device. This is a marked advantage since it means that the reaction zone (vessel 22) in which urea is converted to melamine does not have heat supplied thereto except the heat supplied by the molten melamine entering the bottom of the reaction zone. Consequently, the walls of the reaction zone may be constructed of a shell or lining of highly corrosion-resistant, inexpensive and poor heat conducting non-metallic materials such as glass or ceramic materials, which shell or lining is made resistant to pressure by a close fitting outer shell of an inexpensive, normally non-corrosion resistant metal such as iron or steel. This makes for an inexpensive unit compared to the narrow reactor tubes heretofore used, which tubes require a lining of a very expensive metal or alloy such as platinum, platinum-iridium, silver or the like. Another advantage of the present invention is the fact that after continuous production of melamine to urea is started, the only heat supplied to the device is to substantially pure molten melamine in a zone (heat exchanger 51) below the reaction zone where no conversion of the urea takes place. Since such molten melamine is substantially non-corrosive, the portion of the device to which heat is supplied (pipe 44 passing through heat exchanger 51) may be constructed of relatively inexpensive metals or alloys which have high heat conductivity and can withstand some corrosion but are not as corrosion resistant as precious metals or alloys. As examples of such relatively inexpensive metals or alloys may be mentioned the so-called stainless alloys of nickel and steel, chromium and steel, and nickel, chromium and steel.

It is thus seen from the foregoing description, that the present invention provides two separate and distinct devices, that is, one device in which molten urea is converted to melamine with the formation of corrosive products without supplying heat thereto from the walls of such device, and another device in which substantially pure, non-corrosive molten melamine is heated to provide the necessary heat to convert urea to melamine in the first mentioned device. Consequently, inexpensive, poor heat conducting, but highly corrosion-resistant, materials may be used in the first mentioned device, and relatively inexpensive, less corrosion-resistant, but highly heat conductive materials may be used in the second mentioned device. This means that the melamine producing device of the present invention is relatively inexpensive as compared to the narrow reactor tubes of prior art devices and also minimizes corrosion and plugging difficulties to an extent not heretofore obtained with prior art devices.

In operating the device and apparatus described herein, it is essential that the temperature be sufficiently high to maintain the melamine in the molten state. Moreover, since the conversion of urea to melamine is an endothermic reaction, and this results in a lowering of the temperature of the molten melamine in vessel 22, it is desirable that the temperature of the molten melamine in vessel 22 be maintained above 400° C., and preferably between 425 and 550° C., although temperatures as high as 600° C. may be used. High temperatures, such as temperatures of 450 to 550° C., are advantageous in that the rate of conversion of urea to melamine is faster than with the lower temperatures, and this results in increased melamine production. However, this advantage is offset to some extent by the higher heat imput required and some loss of melamine with the gases released through valve 42 due to increased formation of melamine vapor.

At the temperatures described above, considerable latitude exists as to the operating pressures used. The pressure should be such that no appreciable deamination of the melamine occurs. Since ammonia is formed during the conversion of the urea, a pressure of at least 1500 pounds per square inch at 380° C. is usually satisfactory. The upper limit of pressure is dependent on the strength of the apparatus and may be as high, for example, as 10,000 pounds per square inch. As the melamine temperature is increased the pressure generally must be increased in order to minimize deamination of the melamine. In general, pressures of 1500 to 6000 pounds per square inch absolute may be used with melamine temperatures of 380 to 600° C., with the lower pressure corresponding to the lower temperatures. A preferred operating pressure range for the prefered molten melamine temperature of 425 to 550° C. is between about 2000 and 6000 pounds per square inch absolute.

The amount of molten urea injected into the molten melamine in vessel 22 may be varied considerably depending on the volume of molten melamine in the vessel, the temperature of the melamine, the point at which the urea is injected into the molten malamine and other factors. Of course, it is also important that the mixture obtained is a fluid mass. In general, relatively large amounts of molten urea may be injected when the molten melamine is at a high temperature (e. g. above 450° C.) as the rate of conversion is rapid, and when the vessel 22 is relatively large in diameter and high since then conversion takes place substantially completely within the molten melamine in the vessel. For example, it is possible, under these conditions, to inject the molten urea into the molten melamine at such a rate and in such quantities that the resulting mixture, at the point of mixing, contains up to about 25 or 30% by weight of molten urea, or the intermediate products formed therefrom, and still maintain a fluid mass. It is preferred, however, to inject the molten urea into the molten melamine in such quantities and at such a rate that the resulting mixture, at the point of injection or mixing, contains less than 20% by weight, and more preferably less than 10% by weight, of urea or intermediate products formed therefrom.

The temperature of the molten urea which is injected into the molten melamine in vessel 22 may be varied considerably. For example, the urea may be just above its melting temperature, that is, above 132° C., or it may be heated to higher temperatures. It is preferred, however, to maintain the urea at temperatures below 275° C. in order to avoid conversion of urea to its intermediate products prior to injection in the molten melamine otherwise plugging or corrosion may take place in pipes 9, 12 and 18 and nozzle 21. However, the temperature of the molten urea may be above 275° C. if the urea is pumped at a sufficiently rapid rate to prevent the formation of insoluble intermediate products in the urea feed pipes. A preferred operating range for the molten urea is about 140 to 250° C.

Various modifications may be made in the apparatus described herein. For example, it is not essential to employ a separate melamine melting apparatus such as tank 27, since solid melamine may be charged directly to vessel 22 and pipe 44 and heated therein to the molten stage. However, this is not as satisfactory an arrangement as using a separate melting tank 27 since it is sometimes quite difficult to obtain the necessary heat input. It is also possible to inject the molten urea vertically into vessel 22 anywhere within the bottom half of vessel 22, and not necessarily in the frusto-conical bottom portion thereof or substantially coincident with the vertical line of vessel 22 as shown. However, the arrangement shown gives maximum utilization of molten melamine for conversion of the urea, and also minimizes corrosion difficulties.

It is possible to use various types of gas and liquid separators other than a simple conical cyclone separator such as separator 39. However, in most instances a simple conical cyclone separator is preferred. This separator may be spaced at a considerable distance from vessel 22, but is preferably located immediately adjacent thereto. It is preferred to connect the top of vessel 22 and the separator 39 by a horizontally positioned pipe 37 so that the pipe opens into the separator in the top half of the separator. The separator and vessel 22 are shown to be connected by a U-shaped pipe but this is not essential as the pipe may have any suitable configuration as long as the pipe can be heated conveniently below the bottom portion of vessel 22. The heating means such as heat exchanger 51 may be located at the lowest portion of the pipe or member connecting the gas separator and vessel 22 instead of immediately under vessel 22 as shown.

It is also possible to withdraw melamine from the apparatus shown at any point between the bottom of vessel 22 and the separator 39, although there is an advantage in withdrawing a portion of the melamine at some point between the separator and the heat exchanger 51 so that heat does not have to be supplied to the portion of melamine which is withdrawn.

Various other modifications and changes may be made in the apparatus and processes described herein as will be apparent to those skilled in the art to which this invention appertains without departing from the spirit and intent of this invention. Accordingly, it is intended that this invention be limited only by the scope of the appended claims.

What is claimed is:

1. A process for the continuous production of melamine which comprises continuously injecting molten urea into molten melamine in the bottom portion of a vertically arranged pressure-resistant reaction vessel, which molten melamine is continuously flowing in a substantially vertical direction, to form a vertically rising suspension of urea in melamine in which suspension said urea and intermediate products derived therefrom are out of contact with the walls of said reaction vessel, said melamine being at a temperature above 400° C. to maintain the resulting suspension in a fluid state and to convert said urea to molten melamine within said reaction vessel, whereby the injected urea is substantially all converted to melamine and gaseous by-products which form bubbles in said molten melamine, allowing the rising stream of molten melamine to overflow continuously from the top portion of said reaction vessel, continuously separating the non-dissolved gaseous by-products from the overflowing molten melamine, allowing the resulting molten melamine to flow continuously downwardly to a level below said vessel and thence upwardly to the bottom portion of said reaction vessel, continuously removing a portion of the molten melamine before it reaches said reaction vessel, continuously supplying heat to the remainder of the molten melamine just prior to its entrance into the bottom portion of said reaction vessel to raise the temperature of the molten melamine above 400° C., this being the sole source of heat for the molten melamine in said reaction vessel, and continuously maintaining the pressure on the molten melamine above 2000 pounds per square inch absolute by controlling the amount of gaseous by-products released.

2. An apparatus for the continuous production of melamine from urea comprising, in combination, a vertically arranged, pressure-resistant reaction vessel, means for continuously supplying molten urea to the bottom portion of said reaction vessel, means for continuously circulating molten melamine in a continuous stream upwardly through said reaction vessel; said last mentioned means comprising an inlet opening in the bottom portion of said reaction vessel, an outlet opening in the top portion of said reaction vessel, a gas-liquid separator, a pipe connecting said outlet opening with the upper portion of said separator, a conduit connecting the lower portion of said separator with said inlet opening, said conduit providing an open passage for the flow of molten melamine from said separator to said reaction vessel and having a portion which is positioned below the level of the bottom of said reaction vessel, and a heat exchanger for heating said conduit along a section of the portion of the conduit adjacent to and below said reaction vessel, whereby the melamine passing through the conduit heated by said heat exchanger is maintained in the molten state and its density is reduced; means for controlling the pressure in said apparatus; and means on said conduit for continuously withdrawing a portion of the melamine from said apparatus.

3. An apparatus for the continuous production of melamine from urea substantially as described in claim 2, but having means for supplying ammonia to the bottom portion of the reaction vessel along with the molten urea.

4. An apparatus for the continuous production of melamine from urea substantially as described in claim 2, but having means for supplying molten melamine to said reaction vessel prior to supplying molten urea to said vessel.

5. An apparatus for the continuous production of melamine from urea substantially as described in claim 2, but further characterized in that the gas-liquid separator is a conical cyclone separator.

6. A process for the continuous production of melamine which comprises continuously injecting molten urea into molten melamine in the bottom portion of a vertically arranged stainless steel reaction vessel, which molten melamine is at a temperature above 400° C. and is continuously flowing in a substantially vertical direction, said molten urea being supplied at a rate sufficient to provide a vertically rising suspension of urea in molten melamine containing less than 20% by weight of urea and intermediate products derived from urea at the point of injection, in which suspension said urea and intermediate products are out of contact with the walls of said reaction vessel, whereby the injected urea is substantially all converted to melamine and gaseous by-products in said reaction vessel which gaseous by-products form bubbles in said molten melamine, allowing molten melamine to overflow from the top portion of said reaction vessel, continuously separating the non-dissolved gaseous by-products from the overflowing molten melamine, allowing the resulting molten melamine to flow downwardly continuously to a level below said reaction vessel and thence upwardly to the lower portion of said reaction vessel, continuously removing a portion of the molten melamine before it returns to said reaction vessel, said portion being substantially equal to the amount of melamine continuously produced in said reaction vessel, continuously supplying heat to the remainder of the molten melamine just prior to its entrance into said reaction vessel and while the molten melamine is at a level below said reaction vessel, to raise the temperature of the molten melamine above 400° C., this being the sole source of heat for the molten melamine in said reaction vessel, and continuously maintaining the pressure on the molten melamine above 2000 pounds per square inch absolute by controlling the amount of gaseous by-products released.

7. A process for the continuous production of melamine which comprises continuously injecting molten urea into molten melamine in the bottom portion of a vertically arranged, pressure-resistant, stainless steel reaction vessel, which molten melamine is at a temperature between 425 and 550° C. and is continuously flowing in a vertical direction, said molten urea being supplied at a rate sufficient to provide a vertically rising suspension of urea in molten melamine containing less than 10% by weight of urea and intermediate products derived from urea at the point of injection, in which suspension said urea and intermediate products are out of contact with the walls of said reaction vessel, whereby the injected urea is substantially all converted to melamine and gaseous by-products in said reaction vessel, which gaseous by-products form bubbles in said molten melamine, allowing molten melamine to overflow continuously from the top of said reaction vessel, continuously separating the non-dissolved gaseous by-products from the overflowing molten melamine, allowing the resulting molten melamine to flow continuously downwardly to a level below said reaction vessel and thence upwardly into the bottom of said reaction vessel, continuously removing a portion of molten melamine before it returns to said reaction vessel, said portion being substantially equal to the amount of melamine continuously formed in said reaction vessel, continuously supplying heat to the remainder of the molten melamine just prior to its entrance into the bottom of said vessel to raise the temperature of the molten melamine to between 425 and 550° C., this being the sole source of heat for the molten melamine in said reaction vessel, and continuously maintaining the pressure on the molten melamine at about 2000 to 6000 pounds per square inch absolute by controlling the amount of gaseous by-products released.

8. An apparatus for the continuous production of melamine from urea comprising, in combination, a vertically arranged pressure-resistant, cylindrical vessel having an inner lining composed of a high corrosion-resistant, non-metallic material, means for continuously circulating molten melamine in a continuous stream upwardly through said vessel; said last mentioned means comprising an inlet opening in the bottom of said vessel, an outlet opening in the top of said vessel, a gas-liquid cyclone separator, a pressure and corrosion-resistant pipe positioned substantially horizontally and connecting said outlet opening with the top half of said separator and being mounted tangentially to the side wall of said separator, a U-shaped pressure-resistant conduit connecting the bottom of said separator and said inlet opening and being composed of a heat conductive, corrosion-resistant, non-precious metal, said conduit proving an unobstructed passageway from said separator to said vessel, and a heat exchanger for heating said conduit along a section of the conduit positioned adjacent to and below said vessel, whereby the melamine passing through the conduit is maintained in a molten state and its density is reduced; means for controlling the pressure in said apparatus; and means on said conduit prior to said heat exchanger for continuously withdrawing a portion of the melamine from said apparatus.

References Cited in the file of this patent

UNITED STATES PATENTS

| | | |
|---|---|---|
| 2,332,527 | Pyzel | Oct. 26, 1943 |
| 2,367,215 | House | Jan. 16, 1945 |
| 2,375,730 | Caldwell et al. | May 8, 1945 |
| 2,375,731 | Caldwell | May 8, 1945 |
| 2,566,223 | Mackay | Aug. 28, 1951 |
| 2,566,224 | Mackay | Aug. 28, 1951 |
| 2,566,227 | Paden | Aug. 28, 1951 |
| 2,566,229 | Mackay | Aug. 28, 1951 |
| 2,604,479 | Rollman | July 22, 1952 |

FOREIGN PATENTS

| | | |
|---|---|---|
| 470,019 | Canada | 1950 |
| 583,504 | Great Britain | 1946 |
| 639,962 | Great Britain | 1950 |